United States Patent

Chou et al.

[11] Patent Number: 5,268,741
[45] Date of Patent: Dec. 7, 1993

[54] METHOD AND APPARATUS FOR CALIBRATING A POLARIZATION INDEPENDENT OPTICAL COHERENCE DOMAIN REFLECTOMETER

[75] Inventors: Harry Chou, Windsor; Wayne V. Sorin, Mountain View, both of Calif.

[73] Assignee: Hewlett-Packard Company, Palo Alto, Calif.

[21] Appl. No.: 829,125

[22] Filed: Jan. 31, 1992

[51] Int. Cl.$^5$ .............................................. G01B 9/02
[52] U.S. Cl. .................... 356/351; 356/73.1; 356/345
[58] Field of Search ............ 356/73.1, 351, 345; 250/227.15, 227.12, 227.14

[56] References Cited

U.S. PATENT DOCUMENTS 4,076,423  2/1978  Bates ............................ 356/351
5,072,111 12/1991  Gilino ........................ 250/227.15

Primary Examiner—Samuel A. Turner
Assistant Examiner—LaCharles Keesee
Attorney, Agent, or Firm—William C. Milks, III

[57] ABSTRACT

An optical coherence-domain reflectometry system provides an interferometer driven by a broadband incoherent light source with the device under test connected to one arm of the interferometer and a movable scanning mirror in the other arm providing a reference signal. The mirror moves at a controlled velocity to produce a Doppler shift in the reference signal frequency. The interference signal is detected and measured by a receiver. In the case where the receiver is a polarization diversity receiver, an intensity modulator and a polarization controller are incorporated into the reflectometer for use in calibrating the receiver. Calibration is also provided for a single photodetector receiver.

20 Claims, 6 Drawing Sheets

METHOD AND APPARATUS FOR CALIBRATING A POLARIZATION INDEPENDENT OPTICAL COHERENCE DOMAIN REFLECTOMETER

BACKGROUND OF THE INVENTION

This invention pertains generally to the field of optical measurements and measuring instruments, and, more particularly, to reflectometers for measuring the characteristics of optical systems, subsystems, and components. Specifically, the invention is directed to a method and apparatus for calibrating an optical measuring instrument in the form of a polarization independent optical coherence domain reflectometer having a polarization diversity receiver, or any optical system that incorporates such a receiver, including an optical telecommunications system. More broadly, the calibration method and apparatus in accordance with the principles of the invention can be applied to calibrate any optical coherence domain reflectometer.

The traditional technique for performing reflectometer measurements is known as optical time domain reflectometry (OTDR). This procedure is useful in the manufacture, installation, and maintenance of optical fiber systems. Briefly, the approach comprises injecting a short intense pulse of light into a fiber and measuring the time-dependent backscattering light signal. This measured signal contains information about the location and magnitude of discontinuities, defects, and anomalies of the fiber and other factors which affect light propagation, such as temperature, mechanical strain, and electric and magnetic fields. A review of this technology has been written by Peter Healey in an article entitled "Review of Long Wavelength Single-Mode Optical Fiber Reflectometry Techniques," published in the Journal of Lightwave Technology, Vol. LT-3, No. 4, August 1985, pp. 876–886.

The conventional OTDR technique becomes less useful when it is applied to small optical systems because of the limits on the measurement resolution inherent in this procedure. Typically, the resolution obtained with an OTDR measurement is of the order of 10 meters, and, in practice, the resolution limit of this approach is approximately 1 meter. See, "OFDR Diagnostics for Fibre and Integrated-Optic Systems," S. A. Kingsley and D. E. N. Davies, Electronics Letters, Vol. 21, No. 10, March 1985, pp. 434–435. Clearly, the conventional OTDR technique is not useful in analyzing small optical systems such as integrated optic circuits, or for high-resolution fiber-optic sensing such as measuring stresses at short intervals along an optical fiber.

Improved resolution can be obtained by means of a technique termed "optical frequency domain reflectometry" (OFDR), or also commonly referred to as FMCW (frequency modulated continuous wave) reflectometry. This procedure is described in the above-referenced article by Kingsley and Davies and in the paper entitled "Optical Frequency Domain Reflectometry in Single-Mode Fiber," written by W. Eickhoff and R. Ulrich, published in Applied Physics Letters 39 (9), 1 November 1981, pp. 693–695. This approach comprises injecting a highly monochromatic beam of light into an optical system, varying the frequency slowly with a time-linear sweep, and detecting the backscattered signal. Detection is achieved by the heterodyne technique, in that the backscattered signal is mixed coherently with the reference input signal. The beat frequency is measured and yields the position of a reflection point in the optical system. The amplitude of the beat signal also determines the backscattering factor and attenuation factor for the reflected light. The article by Kingsley and Davies, cited above, reports a resolution of about 3 millimeters obtained by this technique and estimates that this can be improved to approximately 1 mm with existing technology.

Clearly, the OFDR technique offers the capability of improved resolution compared to the conventional OTDR procedure. Since the OFDR approach is a coherent measurement of interference between a backscattering signal and a reference signal, it also offers a greater dynamic range and improved signal-to-noise ratio over a standard OTDR measurement of reflected signal power. Since the OFDR technique requires only low optical input signal power, the nonlinear effects of optical transmission in the optical fiber are reduced. However, there are also certain drawbacks to the OFDR procedure. Not only does the approach require a highly monochromatic source, but it is also sensitive to frequency-sweep nonlinearities, and it is limited by the frequency sweep range.

It is also noted that heterodyne detection has been used in OTDR systems with very short pulses to achieve resolutions in the micrometer range. Systems of this type are described in a paper by R. P. Novak, H. H. Gilgen, and R. P. Salathe, entitled "Investigation of Optical Components in Micrometer Range Using an OTDR System With the Balanced Heterodyne Detection," and a paper by P. Beaud, J. Schutz, W. Hodel, H. P. Weber, H. H. Gilgen, and R. P. Salathe, entitled "High Resolution Optical Time Domain Reflectometry for the Investigation of Integrated Optical Devices," published in the IEEE Journal of Lightwave Technology, Vol. 25 (1989), pp. 755–759. For purposes of clarity, this technique may be termed "coherent OTDR." These authors report that by using ultrashort pulses and a coherent detection scheme, the OTDR technique can achieve resolutions of about 60 $\mu$m in air.

Further improvement in resolution has been obtained by another technique known as "optical coherence domain reflectometry" (OCDR). This procedure is described in the following three articles: (1) "Optical Coherence-Domain Reflectometry: A New Optical Evaluation Technique," by Robert C. Youngquist, Sally Carr, and D. E. N. Davies, Optics Letters, Vol. 12, No. 3, March 1987, pp. 158–160; (2) "New Measurement System for Fault Location in Optical Waveguide Devices Based on an Interferometric Technique," K. Takada, I. Yokohama, K. Chida, and J. Noda, Applied Optics, Vol. 26, No. 9, 1 May 1987, pp. 1603–1606; and (3) "Guided-Wave Reflectometry with Micrometer Resolution," B. L. Danielson and C. D. Whittenberg, Applied Optics, Vol, 26, No. 14, 15 July 1987, pp. 2836–2842. The OCDR approach differs from the coherent OTDR technique in that, instead of a pulsed light source, a broadband continuous-wave source with a short coherence length is used. The source beam enters an interferometer in which one arm has a movable mirror, with the reflected light from this mirror providing a reference beam, and the other arm contains the optical system being tested. The interference signal in the coherently mixed reflected light from the two arms is detected by a heterodyne detection technique and yields the desired information about the optical system.

In essence, the OCDR procedure replaces the beam pulses by the "coherent domains" in a broadband continuous beam, where a domain is defined as a section of the beam in which the light phases are coherently related. The average size of these sections is termed the "coherence length," $l_c$, and is of the order $l_c \sim c/\Delta\nu$, where c is the speed of light and $\Delta\nu$ is the frequency spread of the light source. See, "Principles of Optics," 4th Edition, M. Born and E. Wolf, Pergamon Press, New York (1970), Section 7.5.8. The heterodyne detection of the backscattered "domains" is accomplished by the technique of "white light interferometry," in which the beam is split into the two arms of an interferometer, reflected by the adjustable mirror and the backscattering site, and coherently recombined. This procedure employs the fact that interference fringes will appear in the recombined beam only when the difference in the optical path length between the two arms is less than the coherence length of the beam, $l_c$. The OCDR systems described in references (1) and (3), above, employ this principle, and reference (3) shows interferograms of fiber gaps in test systems obtained by scanning the adjustable mirror and measuring the strength of the recombined signal. Reference (1) also describes a modified approach in which the mirror in the reference arm oscillates at a controlled frequency and amplitude, causing a time-varying Doppler shift in the reference signal, and the recombined signal is fed into a filtering circuit to detect the beat frequency signal.

Another variation of the OCDR technique is illustrated in reference (2), above, in which the reference arm mirror is at a fixed position, and the difference in optical path lengths in the two arms may exceed the coherence length. The combined signal is then introduced into a second Michelson interferometer with two mirrors, one fixed in position and the other being movable. This movable mirror is scanned, and the difference in path length between the arms of the second interferometer compensates for the delay between the backscattered and reference signals at discrete positions of the mirror corresponding to the scattering sites. In practice, an oscillating phase variation at a definite frequency is imposed on the signal from the backscattering site by means of a piezoelectric transducer modulator (PZT) in the optical fiber leading to this site. The output signal from the Michelson interferometer is fed to a lock-in amplifier, which detects the beat frequency signal arising from both the PZT modulation and the Doppler shift caused by the motion of the scanning mirror. This procedure has been used to measure irregularities in glass waveguides with a resolution as short as 15 μm. See, "Characterization of Silica-Based Waveguides with an Interferometric Optical Time-Domain Reflectometry System Using a 1.3-μm-Wavelength Superluminescent Diode," K. Takada, N. Takato, J. Noda, and Y. Noguchi, Optics Letters, Vol. 14, No. 13, 1 July 1989, pp. 706–708.

In short, the OCDR approach offers the capability of high-resolution measurement of optical systems, together with all of the other advantages of coherent reflectometry. The optical dynamic range obtainable with this technique can exceed 100 dB on the power logarithmic scale, which implies that refractive index discontinuities of $10^{-5}$ producing reflected light of the order of 1 femtowatt can be detected. The fundamental limitation on the resolution is the coherence length of the light source, which can be reduced to a few micrometers, with a corresponding increase in source bandwidth.

To summarize the technological state of the art, it is known that improved resolution and signal-to-noise ratios in reflectometry systems can be obtained by using coherent detection schemes; that is, optical interferometry systems in which the reflection signal is coherently mixed with a reference signal and the resulting interference signal is detected. Furthermore, the optimal coherent detection scheme from the standpoint of resolution is the OCDR, in which the resolution is determined by the coherence length of the light source. This resolution can be made very small by using a broadband source.

However, the OCDR, OFDR, and coherent OTDR techniques all share a common problem arising from dependence on the polarization properties of the light beams. This problem arises from the fact that interference between two beams of light can only occur when both beams have the same polarization state. More precisely, the interference signal of two light beams is the incoherent sum of the interference signals from the beam components in two orthogonal polarization states. For example, if one beam is linearly polarized in the horizontal direction and the other beam is linearly polarized in the vertical direction, no interference will occur. Ideally, when the entering beam is split into the two arms of an interferometer, and reflected and coherently recombined, the beam polarization is unchanged. Reference (2), above, includes a polarizer and analyzer mutually aligned at the entrance and exit fibers of the first interferometer to provide this constraint. In practice, any real optical fiber will cause a certain amount of distortion of the polarization of the light propagating therethrough. Changes in the polarization of signals in one arm of the interferometer, or uncorrelated changes in both arms, will degrade the resulting interference signal. Furthermore, this polarization distortion may be time-dependent. Polarization noise and cross-talk in a fiber may be caused by internal and external perturbations from mechanical, thermal, and electromagnetic effects, and can produce fading or reduced visibility of the observed fringes in an interferogram. In addition, the signature of a given backscattering site can be complicated by the group delay differences between two polarization eigenmodes in a birefringent fiber.

In the reflectometry situation, one can eliminate part of the polarization stability problem by careful design and fabrication of the interferometer. Polarization-maintaining fibers can be used, and the measuring instrument can be encased in a housing to substantially insulate it from environmental perturbations. This is only a partial solution because in operation the instrument must be connected to the device being tested, presumably through optical fibers or other transmission means, and polarization distortion may occur in these external fibers or signal conduits. Furthermore, the device under test may itself produce variations in the polarization of the reflectometry signal at reflection or refraction sites or in the optical conduits within the test device. These perturbations may be environmental in origin and may fluctuate with time in an essentially uncontrollable manner. Therefore, in an optical coherence domain reflectometer there is always a polarization instability problem with respect to the optical signals being transmitted and received in the arm of the interferometer that is connected to the device under test.

There is also an additional shortcoming with respect to the above-mentioned references. None of these references or other works in the published literature addresses calibration of an optical coherence domain reflectometer to enable correction of measurements to eliminate the effects of polarization distortion.

A coherent optical reflectometry system which overcomes the problem of polarization variations and distortions during measurements on optical fibers and system components is described in copending U. S. patent application Ser. No. 07/610,188, filed on Nov. 7, 1990, assigned to the same assignee as this application, the disclosure of which is hereby incorporated by reference in its entirety. In particular, in one embodiment, an optical coherence domain reflectometer is disclosed having a light-emitting diode (LED) to provide a broadband source of unpolarized light, and an interferometer in which one arm contains the optical system or device under test (DUT) and the other arm contains a scanning mirror to provide the reference light beam. The reflectometer further includes a polarization diversity receiver (PDR) into which the coherently recombined reflected light is directed. The scanning mirror is driven at a fixed speed to provide a Doppler-shifted reference light signal.

The reference arm also contains a rotationally adjustable polarizer so that the reflected reference signal is linearly polarized. Further fine control of this polarization may be provided by a polarization controller in the DUT arm of the interferometer. The polarization axis may be rotated about the optical axis to calibrate the reflectometer so that equal reference beam powers are provided in the two orthogonal polarization detector circuits of the PDR.

In an alternative embodiment, the light source is an LED followed by a polarizer which provides polarized light. In this version, the linear polarizer in the reference beam arm is replaced by an adjustable birefringent element such as a waveplate or polarization controller. In this alternative embodiment, the reflectometer is calibrated by adjusting the birefringent element to balance the reference beam powers in the detector circuits of the PDR.

Further alternative versions of the reflectometer include additional polarization controllers in the interferometer reference arm or the beam output channel, or both. These polarization controllers allow further fine tuning adjustment and calibration of the reflectometer to compensate for perturbations in the system that affect the light polarization.

In actual use, the reflectometer is first calibrated so that the reference signal $\bar{E}_r(t)$ has equal components of horizontal and vertical linear polarization, so that equal reference beam power is directed to each branch of the PDR. This is performed by first disconnecting the DUT, so that the reflection coefficient R is negligible, and then rotating a linear polarizer incorporated into the reference arm.

However, the calibration technique disclosed in aforementioned U. S. patent application Ser. No. 07/610,188 has various shortcomings. Central to the operation of the PDR is knowledge of how the optical fields of the reference beam are split between two photodetectors. Each photodetector, however, produces a photocurrent proportional to the optical power, not the optical field, incident thereon. Even though it is possible to deduce the split of the fields from the split of the powers, such deduction requires detailed knowledge of all the proportionality constants. A further complication is that, typically, the photocurrent is not directly measured, but amplified into a voltage signal by a transimpedance amplifier, which may be followed by other signal processing electronics. The gain of each of these electronic stages becomes another proportionality constant to be characterized in order to convert the power into the field. Therefore, fully calibrated measurements are not achievable.

Thus, there is a need for a simple and effective calibration procedure that removes the uncertainties in the combined proportionality constants in an optical coherence domain reflectometer. It would also be highly desirable to remove uncertainties in the electronic gains in the reflectometer receiver to thereby enhance the accuracy of the measuring instrument.

SUMMARY OF THE INVENTION

An object of the invention is to provide a method for easily calibrating and adjusting an optical coherence domain reflectometer to provide polarization independent reflectometry signals.

Another object of the invention is to provide a method for easily calibrating and adjusting an optical coherence domain reflectometer having a polarization diversity receiver to provide polarization independent reflectometry signals.

Yet another object of the invention is to provide a method for easily calibrating and adjusting any optical system, such as an optical telecommunications system, having a polarization diversity receiver to provide polarization independent signal reception.

In accordance with one embodiment of the apparatus of the invention, an intensity modulator is incorporated to modulate the source in a polarization independent optical coherence domain reflectometer, and a polarization controller is incorporated into the optical input to a polarization diversity receiver in the reflectometer. The calibration method in accordance with one embodiment of the invention comprises two parts. In the first part, any imbalance in the gains of the two channels (V and H) of the polarization diversity receiver is detected, while the light beam generated by the source is being intensity-modulated, and a record of the imbalance is stored for later use. This procedure need not be performed at every calibration, but only when it is necessary to correct for any drift in electronic gains in the detection circuitry of the polarization diversity receiver.

In the second part, the calibration for a particular measurement is performed. Specifically, the polarization state of the light returned from a reference path of the reflectometer, while the source is being intensity-modulated, is restricted to a certain range by balancing the V and H channels of the polarization diversity receiver using the polarization controller, with an optical absorber or non-reflecting optical device connected to a test path of the reflectometer. This removes the ambiguity associated with searching through all possible polarization states to obtain a calibrated measurement. A computation then ensures that, for this restricted range of polarization states, the correct result is obtained by measuring a known reflection and scaling the measurement trace of the known reflection. Because the scaling factor is derived based on knowledge of the characteristics of the known reflection and can incorporate the factors which remove the uncertainties in the electronic gains in the detection circuitry of the polarization diversity receiver, measurements on a device under test substituted for the known reflection, using the unmodulated source, will have a calibrated amplitude.

Furthermore, the method and apparatus for calibrating an optical coherence domain reflectometer in accordance with the invention can also be modified to apply to calibration of an optical coherence domain reflectometer having a single photodetector receiver. In this modified calibration method, the user first terminates the test arm with a known reflection, next maximizes the fringe visibility using a polarization controller incorporated into either the reference beam path or the test beam path, then records the signal level, and thereafter divides this signal level into that obtained when the known reflection is replaced by a device under test and the fringe visibility is again maximized.

These and other objects, advantages, characteristics and features of this invention may be better understood by examining the following drawings together with the detailed description of the preferred embodiments which appears below.

DETAILED DESCRIPTION OF THE PREFERRED EMBODIMENTS

Figure 1:
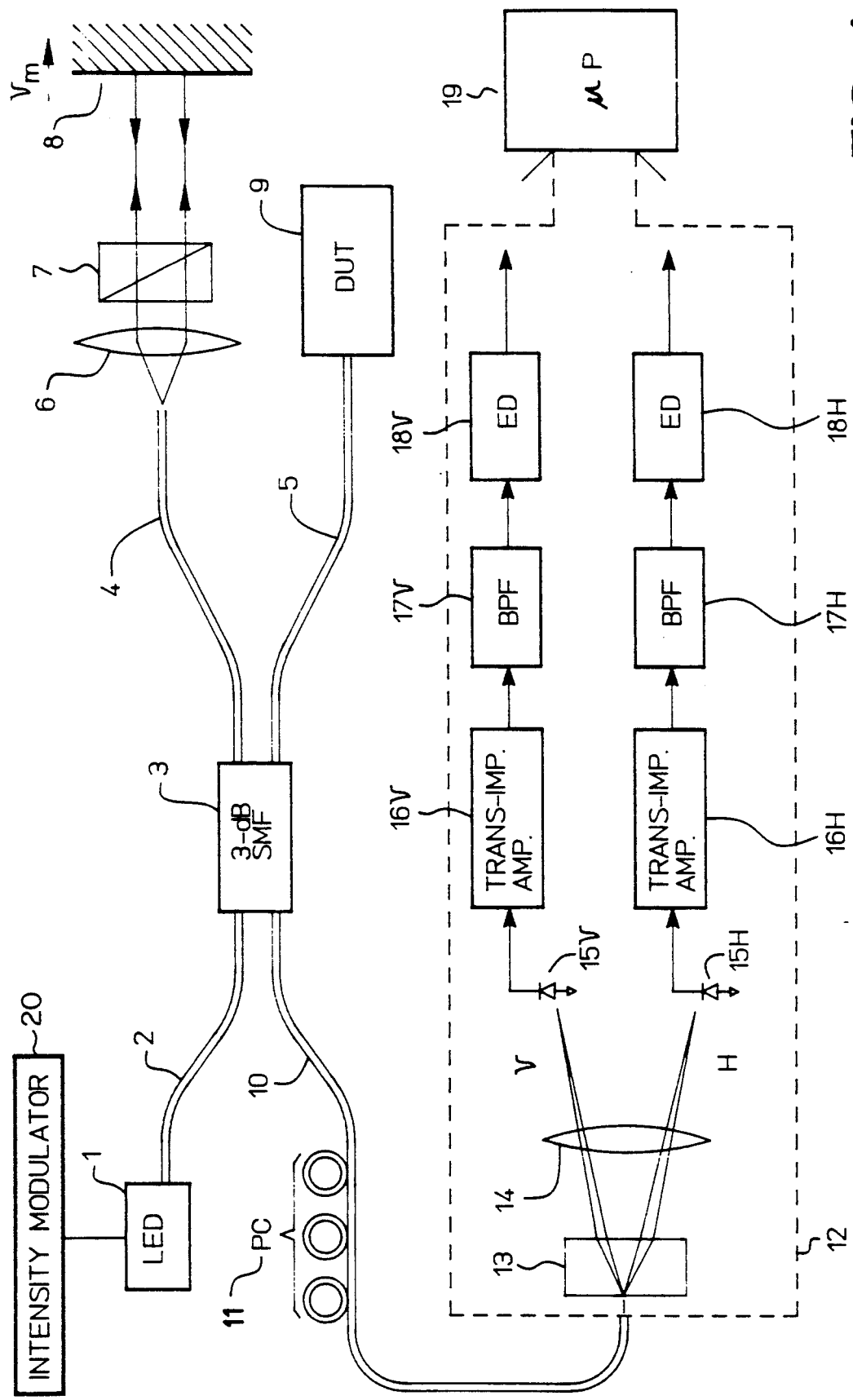
FIG. 1 is a schematic optical and electronic circuit diagram of a reflectometer, showing the interferometer having a polarization diversity receiver (PDR)

FIG. 1 shows an implementation of a polarization independent optical coherence domain reflectometer similar to the one described in aforementioned U. S. patent application Ser. No. 07/610,188. An optical source comprises a broadband emitter such as a light emitting diode (LED) 1, optically coupled to a single-mode optical fiber 2. The essential requirement of the LED source 1 is that the coherence length of the light beam generated by the source must be sufficiently short to achieve the desired resolution of the reflectometer. The optical fiber 2 forms the input channel of an interferometer. The LED light in the fiber 2 is equally split into a reference arm 4 and a test arm 5 of the interferometer by a single-mode 3-dB power splitter 3.

The light beam exiting the reference arm optical fiber 4 is collimated by a lens 6, polarized by a linear polarizer 7, and reflected back along the same optical path by a scanning reference mirror 8. This constitutes the reference beam path of the reflectometer.

During a measurement, the test arm optical fiber 5 is connected to a device under test (DUT) 9, which may contain reflective surfaces that reflect the light back into the fiber 5. This constitutes the test beam path of the reflectometer.

The 3-dB power splitter 3 combines the returned reference and DUT beams from the optical fibers 4 and 5 and directs the combined beam into the output arm optical fiber 10 that connects the power splitter to a polarization diversity receiver 12. Preferably, the light exiting the output arm optical fiber 10 is split into two orthogonal polarization components V (vertical) and H (horizontal) by a polarization beam splitter 13. In accordance with the usual convention, these designations (V and H) refer to the direction of the electric field in the optical signal. The two components are imaged onto photodetectors such as photodiodes 15V and 15H in the two channels, V and H, of the polarization diversity receiver 12 by a lens 14.

Each channel of the polarization diversity receiver 12 contains the photodiode 15V or 15H, a trans-impedance amplifier 16V or 16H, a bandpass filter (BPF) 17V or 17H, and an envelope detector (ED) 18V or 18H, respectively. This type of receiver is referred to as a polarization diversity receiver to distinguish it from a single photodetector receiver which will be described later.

The currents produced by the photodiodes 15V and 15H are proportional to the intensities of the vertically and horizontally polarized components of the beam, respectively. The output of each photodiode 15V or 15H is connected to an input of the respective trans-impedance amplifier 16V or 16H which converts the photocurrent to a voltage. The output of each trans-impedance amplifier 16V or 16H is connected to an input of the respective bandpass filter 17V or 17H. These bandpass filters 17V and 17H filter out the dc and high-frequency carrier components of the photodiode signals. The output of each bandpass filter 17V or 17H is connected to an input of the respective envelope detector 18V or 18H. The output of each envelope detector 18V or 18H is connected to a microprocessor circuit 19 having an analog-to-digital converter, which functions as the "squaring circuit" ($X^2$), labelled 20V and 20H, respectively, and the "adder circuit" ($+$), designated 21, described in connection with FIG. 1 in aforementioned U. S. patent application Ser. No. 07/610,188.

In a typical reflectometer measurement, the reference mirror 8 is reciprocated along the axis of the collimated beam at a constant velocity $V_m$. When the path length difference between the reference and DUT beams is within the coherence length of the LED source 1, an interference signal is produced and detected by the polarization diversity receiver 12. (Here the path lengths are defined from the exit point of the 3-dB power splitter 3 to the reflective surfaces in the reference beam path and test beam path, then back to the entry point of the polarization diversity receiver 12.) The motion of the reference mirror 8 introduces a Doppler shift $f_D$ to the interference signal given by:

$$f_D = \frac{2V_m}{\lambda}, \tag{1}$$

where $\lambda$ is the center wavelength of the LED source 1. To detect the interference signal, the center frequency of the bandpass filters 17V and 17H is selected to be the Doppler shift. The frequency passband of the bandpass filters 17V and 17H is therefore correlated with the mirror velocity.

For typical LED's, the coherence length is about 10 $\mu$m. This reflectometer therefore offers a means for locating reflective surfaces in the DUT 9 with a precision of about 10 $\mu$m.

The magnitude of the interference signal contains information about the return loss of the DUT 9, i.e., how much of the light entering the DUT is reflected and recaptured by the optical fiber 5. This signal, however, also depends on the polarization states of the returned reference and DUT beams as they enter the polarization diversity receiver 12.

For example, in a single photodetector receiver, if the polarization states of the returned reference and DUT beams are identical, a strong signal will be produced. On the other hand, if they are substantially orthogonal to each other, the signal will be very small. Since optical fibers can transform the polarization state of the reflected light, the signal can vary over a wide range even if the DUT return loss is polarization independent. Therefore, special measures are needed to avoid this unwanted polarization dependence in the interference signal. Indeed, it is the purpose of the polarization diversity receiver 12 to reduce such ambiguities in the measurement. The operating principles of such a receiver as used in a coherence domain reflectometer are described in more detail in aforementioned U. S. patent application Ser. No. 07/610,188.

The operation of the reflectometer shown in FIG. 1 will now be described in terms of the optical fields. In the following discussion, it is assumed that the path length differences between the interfering fields are within the coherence length of the LED source 1. This is a simplification in that it does not accurately model the statistical and the broadband nature of the source, which plays a vital part in the operation of the reflectometer. However, this allows the description to concentrate on the coherent fields and greatly simplifies the discussion without affecting the validity of the calibration method in accordance with the invention.

Let $\bar{E}_r$ denote the optical field incident on the polarization diversity receiver 12 due to the returned reference signal alone, i.e., when the test arm 5 has negligible reflection. $\bar{E}_r$ can be decomposed into its horizontal and vertical components in the frame of reference of the polarization diversity receiver 12. These components will in general have different magnitudes and phases and can be written as:

$$E_{rV} = E_r \sin \theta_r e^{j(\omega + 2\pi f_D)t}$$

$$E_{rH} = E_r \cos \theta_r e^{j(\omega t + \delta_r)} \quad (2)$$

where $\cos \theta_r$ and $\sin \theta_r$ are the magnitude splitting coefficients, $\delta_r$ is the relative phase between the two components, $\omega$ is the angular frequency of the optical field, $f_D$ is the Doppler frequency shift introduced by the motion of the reference mirror 8 moving at a constant velocity $V_m$, and j is the square root of $-1$. In the absence of the any test arm reflection, the photocurrents in the photodiodes 15V and 15H are given by:

$$I_{rV} = R_V E_r^2 \sin^2 \theta_r$$

$$I_{rH} = R_H E_r^2 \cos^2 \theta_r \quad (3)$$

to within a common multiplicative constant, where $R_V$ and $R_H$ are the responsivities of the two photodiodes (in A/W). These photocurrents are converted into voltage signals by the subsequent electronics, whose overall gains can be designated $G_V$ and $G_H$.

The quantities needed for the calibration are $G_V I_{rV}$ and $G_H I_{rH}$. These quantities cannot be obtained simply by measuring the signals at the outputs of the envelope detectors 18V and 18H because the bandpass filters will not pass the dc photocurrents.

To circumvent this difficulty, in accordance with the invention, an intensity modulation of the source light beam can be introduced at the center frequency of the bandpass filters 17V and 17H. Since the modulation is common to the two channels (V and H), it only introduces a common multiplicative factor to the two envelope-detected signals, which can be corrected for later.

Accordingly, let:

$$K_V = m R_V G_V E_r^2 \sin^2 \theta_r$$

$$K_H = m R_H G_H E_r^2 \cos^2 \theta_r \quad (4)$$

denote the signals at the outputs of the envelope detectors 18V and 18H when the LED source 1 is intensity-modulated at the Doppler frequency $f_D$, with m being the intensity modulation index. Now, the V and H components of the optical field incident on the polarization diversity receiver 12 due to the reflection from the DUT 9 alone (i.e., in the absence of the reference optical field) can be written as:

$$E_{DUT,V} = E_{DUT} \sin \theta_{DUT} e^{j\omega t}$$

$$E_{DUT,H} = E_{DUT} \cos \theta_{DUT} e^{j(\omega t + \delta_{DUT})} \quad (5)$$

where $\cos \theta_{DUT}$ and $\sin \theta_{DUT}$ are the magnitude splitting coefficients of the DUT-reflected optical field, and $\theta_{DUT}$ is the relative phase between the two components. Again, $\omega$ is the angular frequency of the optical field.

When the DUT-reflected field is combined with the reference field, the photocurrents produced by the photodiodes 15V and 15H of the polarization diversity receiver 12 are given by:

$$I_V = R_V(E_r^2 \sin^2 \theta_r + E_{DUT}^2 \sin^2 \theta_{DUT} + 2 E_r E_{DUT} \sin \theta_r \sin \theta_{DUT} \cos 2\pi f_D t)$$

$$I_H = R_H[E_r^2 \cos^2 \theta_r + E_{DUT}^2 \cos^2 \theta_{DUT} + 2 E_r E_{DUT} \cos \theta_r \cos \theta_{DUT} \cos(2\pi f_D t + \delta_r - \delta_{DUT})] \quad (6)$$

to within a common multiplicative constant. The peak signals at the output of the envelope detectors 18V and 18H are then given by:

$$S_V = R_V G_V E_r E_{DUT} \sin \theta_r \sin \theta_{DUT}$$

$$S_H = R_H G_H E_r E_{DUT} \cos \theta_r \cos \theta_{DUT} \quad (7)$$

to within a common multiplicative constant.

The task here is to generate a signal proportional to $E_{DUT}$ independent of $\theta_{DUT}$ so that the signal is independent of the polarization state of the DUT-reflected field. This can be accomplished by processing $S_V$ and $S_H$ in Equation (7) in the following manner:

$$S^2 = \frac{S_V^2}{K_V} + \frac{R_V G_V}{R_H G_H}\left[\frac{S_H^2}{K_H}\right] \quad (8)$$

$$= \frac{R_V G_V}{m} E_{DUT}^2$$

which is indeed independent of $\theta_{DUT}$.

The signal processing step represented by Equation (8) requires knowledge of the ratio $R_V G_V / R_H G_H$. This ratio can be obtained as follows.

With the test arm 5 terminated such that the optical field present at the polarization diversity receiver 12 is due to the reference field only, and with an intensity modulation on the light beam from the LED source 1 at the Doppler frequency $f_D$, all of the optical power can be input to one channel (e.g., the vertical channel) and then the other (the horizontal channel) by using a polarization controller. Since the intensity modulation impinging on each photodiode 15V or 15H is the same, any difference in the resulting electronic signals must be due to the differences in the responsivities of the photodiodes and the electronic gains of the two channels V and H. Thus, the signals produced in this manner can be expressed as:

$J_v = mR_vG_vE_r^2$ (all the reference power in channel V)

$J_H = mR_HG_HE_r^2$ (all the reference power in channel H) (9)

to within a common multiplicative constant, where $E_r$ is the magnitude of the reference optical field and m is the intensity modulation index. Thus, the ratio of the electronic gains can be obtained by taking the ratio of $J_v$ and $J_H$:

$$\frac{J_V}{J_H} = \frac{R_V}{R_H}\left[\frac{G_V}{G_H}\right]. \quad (10)$$

Combining Equations (8) and (10) yields:

$$S^2 = \frac{S_V^2}{K_V} + \frac{J_V}{J_H}\left[\frac{S_H^2}{K_H}\right]. \quad (11)$$

The magnitude of the calibration factor $S^2$ in Equation (11) can be scaled correctly to correspond to a known reflection. This is accomplished by dividing the measurement of the known reflection (i.e., the data points comprising the measurement trace for the known reflection) by $S^2$. This then constitutes the polarization independent magnitude calibration of the reflectometer.

Accordingly, as shown in FIG. 1, the apparatus needed to implement calibration in accordance with one embodiment of the invention is means 20 for modulating the intensity of the LED source 1, as well as a polarization controller 11 preferably incorporated into the output arm optical fiber 10 that connects the 3-dB power splitter 3 to the polarization diversity receiver 12. One embodiment of a method in accordance with the invention for calibrating the reflectometer shown in FIG. 1 is as follows.

Figure 2A:
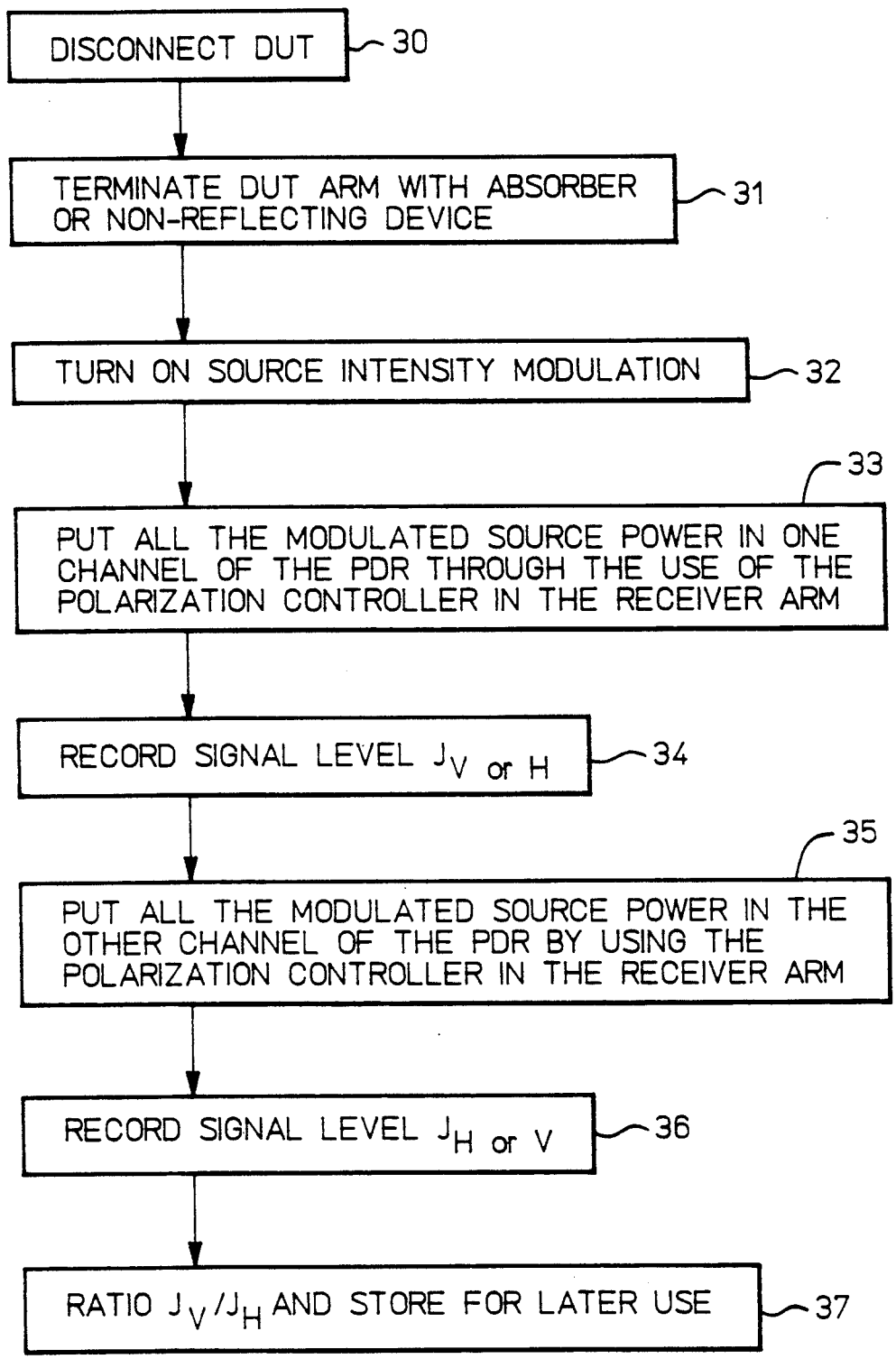
FIGS. 2A and 2B, are flow charts of one embodiment of the method in accordance with the invention for calibrating the polarization independent optical coherence domain reflectometer shown in FIG. 1.
Figure 2B:
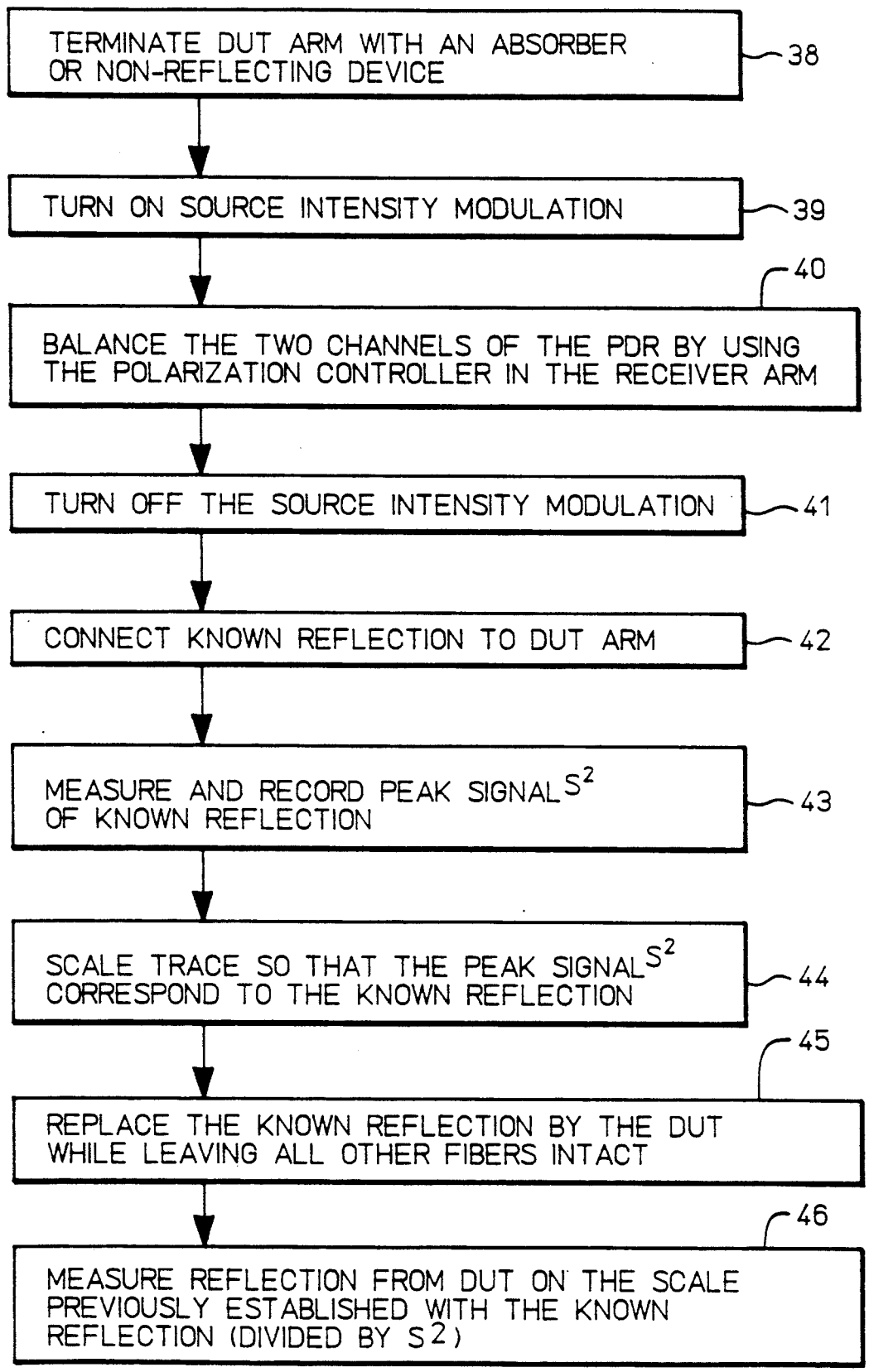

The calibration method in accordance with one embodiment of the invention is illustrated in the flow charts of FIGS. 2A and 2B. The calibration comprises two parts. In the first part, shown in FIG. 2A, any imbalance in the gains of the two channels V and H of the polarization diversity receiver 12, while the LED source 1 is being intensity-modulated, is detected and stored for later use. This procedure need not be performed at every calibration, but only when it is necessary to correct for any drift in electronic gains in the detection circuitry of the polarization diversity receiver 12.

In the second part, shown in FIG. 2B, the calibration for a particular measurement is performed. Specifically, the polarization state of the light returned from the reference beam path, while the LED source 1 is being intensity-modulated, is restricted to a certain range by balancing the V and H channels using the polarization controller 11, with an optical absorber or non-reflecting optical device connected to the test arm 5. This removes the ambiguity associated with searching through all possible polarization states to obtain a calibrated measurement. A computation then ensures that, for this restricted range of polarization states, the correct result is obtained by measuring a known reflection and scaling the measurement trace of the known reflection. Because the scaling factor is based on knowledge of the characteristics of the known reflection and can incorporate the factors which remove the uncertainties in the electronic gains in the detection circuitry of the polarization diversity receiver (FIG. 2A), the measurements on the DUT 9 substituted for the known reflection, using the unmodulated LED source 1, will have a calibrated amplitude.

Considered in more detail, initially, the DUT 9 is not connected to the test arm optical fiber 5. If the DUT 9 has previously been connected to the test arm optical fiber 5, the DUT is disconnected, as indicated by the numeral 30 shown in FIG. 2A.

Then, as indicated by the numeral 31 shown in FIG. 2A, the test arm optical fiber 5 is terminated with an optical absorber or non-reflecting optical device. Next, the intensity modulator 20 is activated to intensity modulate the light beam generated by the LED source 1, as indicated by the numeral 32 shown in FIG. 2A.

The modulation can be produced by varying the dc drive current to the LED source 1 to thereby intensity modulate the light beam generated by the source. The modulation frequency is at the Doppler frequency $f_D$ correlated to the velocity $V_m$ of the reference mirror 8 and, in one implementation, is approximately 27 kHz.

Thereafter, as indicated by the numeral 33 shown in FIG. 2A, the polarization controller 11 incorporated into the output arm 10 is operated so that all of the modulated source power is input to one channel (either the V channel or the H channel) of the polarization diversity receiver 12. The signal level in this channel (either the V channel or the H channel) is then stored as $J_i$ (i=V, H), as indicated by the numeral 34 shown in FIG. 2A.

Subsequently, as indicated by the numeral 35 shown in FIG. 2A, the polarization controller 11 is operated so that all of the modulated source power is input to the other channel (either the H channel or the V channel, as the case may be) of the polarization diversity receiver 12. The signal level in this other channel (either the H channel or the V channel, as the case may be) is then stored as $J_i$ (i=V, H), as indicated by the numeral 36 shown in FIG. 2A.

As indicated by the numeral 37 shown in FIG. 2A, the values for $J_i$ (i=V, H) are used to compute the ratio $J_V/J_H$ shown in Equation (10), which is stored for later use to correct for any drift in the electronic gains. The following steps shown in FIG. 2B are then additionally needed in connection with calibration for a specific measurement.

As shown in FIG. 2B, the next procedure of the calibration method is to again terminate the test arm optical fiber 5 with an optical absorber or non-reflecting optical device, as indicated by the numeral 38. Next, as indicated by the numeral 39 shown in FIG. 2B, the intensity modulator 20 is again activated to intensity modulate the light beam generated by the LED source 1. Then, the polarization controller 11 incorporated into the output arm 10 is operated so that the modulated source power is split between the V channel and the H channel of the polarization diversity receiver 12 so that the signals produced by the two channels at the outputs of the envelope detectors 18V and 18H are balanced, as indicated by the numeral 40 shown in FIG. 2B. Thereafter, as indicated by the numeral 41 shown in FIG. 2B, the source intensity modulation is discontinued.

Subsequently, the optical absorber or non-reflecting optical device is disconnected from the test arm optical fiber 5, and the test arm fiber is terminated with an optical device having a known reflection coefficient, as indicated by the numeral 42 shown in FIG. 2B. Alternatively, the terminus of the test arm optical fiber 5 remote from the 3-dB power splitter 3 is simply allowed to interface with the atmosphere, which produces approximately a 4.0 percent reflection.

At this juncture, the scanning reference mirror 8 is reciprocated, and the peak signal $S^2$ obtained in accordance with Equation (11) is measured and stored, as indicated by the numeral 43 shown in FIG. 2B. During performance of the step 43 shown in FIG. 2B, the earlier setting of the polarization controller 11, which produced balanced outputs from the V and H channels when the optical absorber or non-reflecting optical device is measured, is maintained.

Finally, as indicated by the numeral 44 shown in FIG. 2B, the measurement on the optical device having the known reflection coefficient is scaled using the measured peak value $S^2$ obtained when the known reflection was measured in accordance with the step 43 shown in FIG. 2B by dividing the data points comprising the measurement trace for the known reflection by $S^2$, so that the peak signal corresponds to the known reflection. This completes the calibration procedure, and readies the reflectometer to perform a calibrated measurement.

In order to perform a calibrated measurement, the optical device having the known reflection coefficient is replaced by the DUT 9, while all other optical fibers are left intact, as indicated by the numeral 45 shown in FIG. 2B. Finally, as indicated by the numeral 46 shown in FIG. 2B, a reflection(s) from the DUT 9 is measured using the scale determined in accordance with the step 44 shown in FIG. 2B. This produces a calibrated measurement on the DUT 9, that is, a measurement having a referenceable amplitude value.

The principles of the foregoing calibration method and apparatus can be directly applied to any optical fiber system that incorporates a polarization diversity receiver such as the polarization diversity receiver 12. Such systems are employed in optical telecommunications. Accordingly, the method and apparatus for calibrating an optical coherence domain reflectometer are applicable to such optical fiber telecommunications systems, as well.

Figure 3:
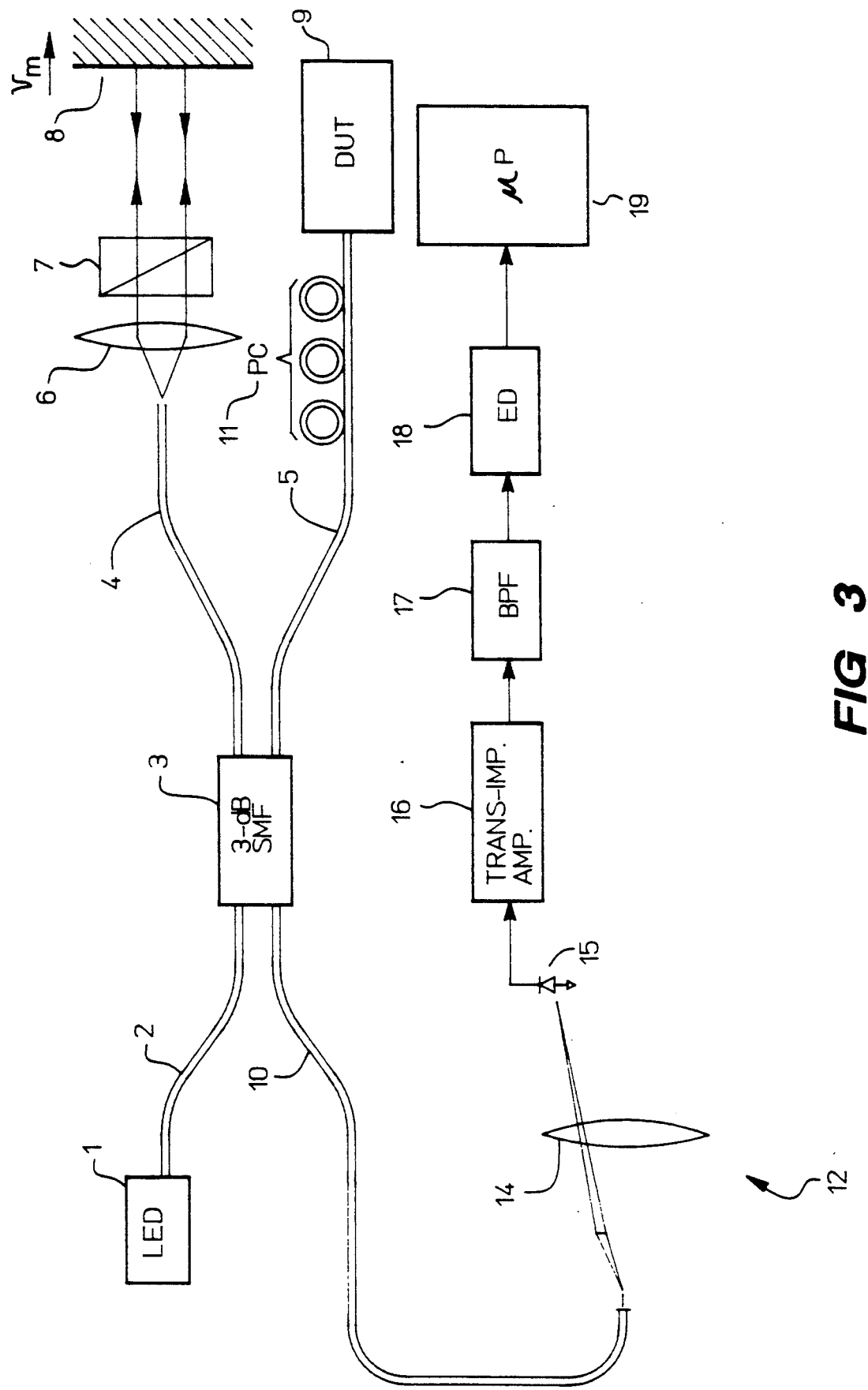
FIG. 3 is a schematic diagram of the reflectometer in an alternative version having an optical receiver with a single photodetector.

Furthermore, the method and apparatus for calibrating an optical coherence domain reflectometer can also be modified to apply to calibration of an optical coherence domain reflectometer having a single photodetector receiver. Such a single channel reflectometer is shown in FIG. 3, in which like reference numerals identify corresponding components shown in FIG. 1. Since the receiver 12' shown in FIG. 3 is a single channel receiver, the polarization beam splitter 13 is not present. Also, since there is only a single channel, the receiver 12' comprises only a single photodiode 15, a single trans-impedance amplifier 16, a single bandpass filter 17, and a single envelope detector 18.

The following modified method can be used in a single photodetector receiver optical coherence domain reflectometer to obtain a calibrated measurement. This modified method is based on the fact that, if the fringe visibility of the interferogram is maximized, the polarization state of the light reflected from the reference path bears a fixed relationship to that reflected from the DUT 9. As long as this condition is maintained, the fringe visibility is independent of the polarization state of the light returned from the DUT 9 alone. Thus, either the reference arm or the DUT arm can be equipped with a polarization controller 11 and through its use always maximize the fringe visibility. In this modified calibration method, the user first terminates the DUT arm with a known reflection, next maximizes the fringe visibility using the polarization controller 11, then records the signal level, and thereafter divides this signal level into that obtained when the known reflection is replaced by the DUT 9 and the fringe visibility is again maximized. This method is shown in the flow chart of FIG. 4.

Considered in more detail, initially, the DUT 9 is not connected to the test arm optical fiber 5. If a DUT 9 is already connected to the test arm optical fiber 5, the DUT is disconnected, as indicated by the numeral 50 shown in FIG. 4.

Figure 4:
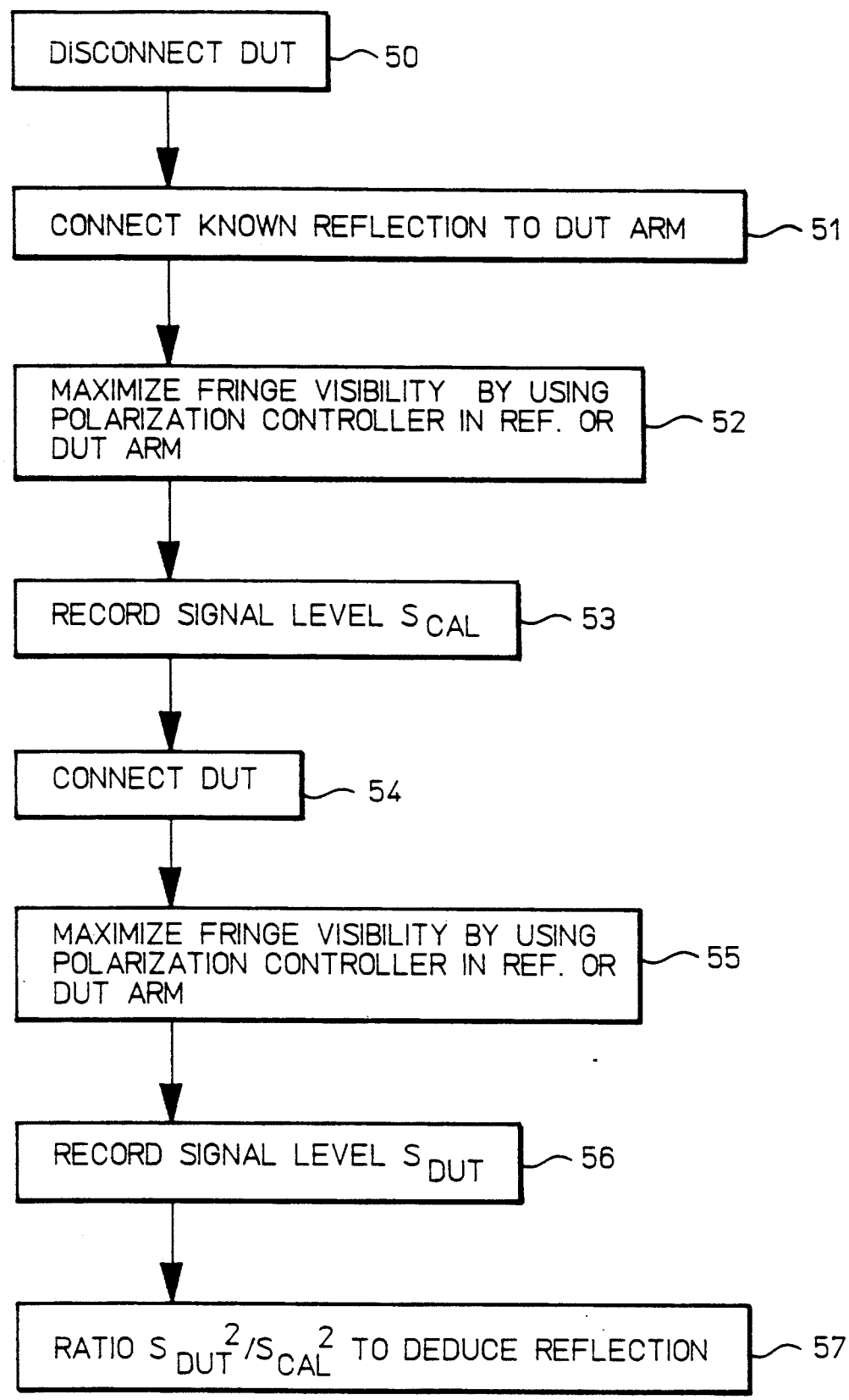
FIG. 4 is a flow chart of one embodiment of a modified method in accordance with the invention for calibrating the reflectometer shown in FIG. 3.

Then, as indicated by the numeral 51 shown in FIG. 4, the test arm optical fiber 5 is terminated with an optical device having a known reflection coefficient. Alternatively, the terminus of the test arm optical fiber 5 remote from the 3-dB power splitter 3 is simply allowed to interface with the atmosphere, which produces approximately a 4.0 percent reflection.

Next, the fringe visibility is maximized, as indicated by the numeral 52 shown in FIG. 4. As the reference mirror 8 travels through an interval in which the optical path length difference for a given reflection site is within the coherence length, a signal will be generated by the bandpass filter 17.

Figure 5:
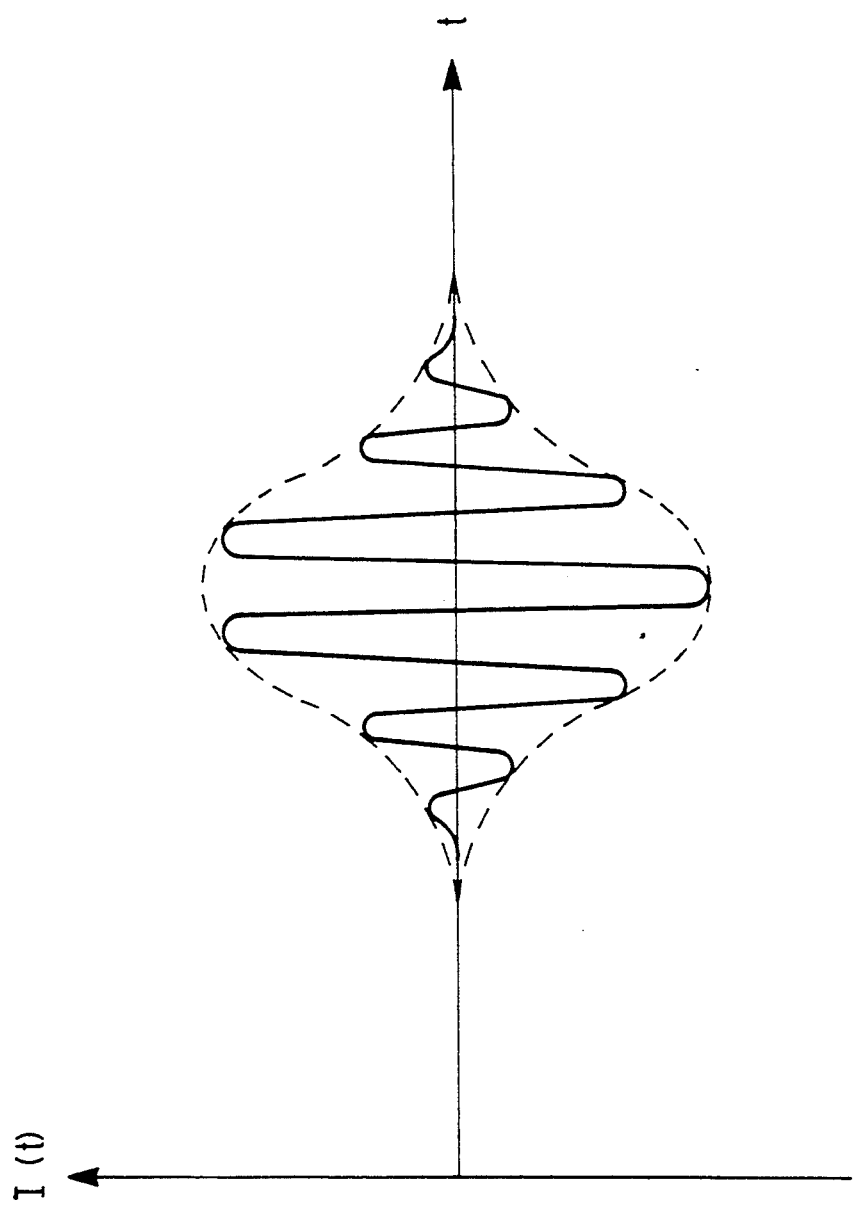
FIG. 5 is a schematic graph of the time dependence of the photocurrent in the optical receiver of the reflectometer shown in FIG. 3.

FIG. 5 is a schematic plot of a representative signal in the channel as a function of time. The current is an oscillatory function of time at a beat frequency corresponding to the spectral component transmitted by the bandpass filter 17, modulated by an envelope function shown by the dotted line in this figure. This envelope function has a width substantially equal to the coherence time. This current is fed into the input of the envelope detector 18, which washes out the oscillatory part of the signal and generates a current that is proportional to the magnitude of the envelope. It is this signal which is maximized. This is accomplished as follows.

The polarization controller 11 incorporated into either the reference arm 4 or the test arm 5 is operated while the scanning reference mirror 8 is reciprocated until the maximum envelope (peak-to-peak) level of the response of the envelope detector 18 is obtained. Alternatively, the length of the reference beam path can be varied, for example, by stretching the reference arm optical fiber 4 instead of reciprocating the reference mirror 8. In either event, the detected peak-to-peak value is the maximum fringe visibility.

Finally, as indicated by the numeral 53 shown in FIG. 4, the maximum fringe visibility value (maximum peak-to-peak level) is stored as a scaling factor $S_{CAL}$. This completes the calibration.

Thereafter, in order to perform a calibrated measurement, the DUT 9 is connected to the terminus of the test arm optical fiber 5 remote from the 3-dB power splitter 3, as indicated by the numeral 54 shown in FIG. 4. Then, as indicated by the numeral 55 shown in FIG. 4, the fringe visibility of the reflection from the DUT 9 is maximized by operating the polarization controller 11 in either the reference arm 4 or the test arm 5 or the reference arm optical fiber is stretched, as the case may be, while the reference mirror 8 is reciprocated.

Next, the maximum fringe visibility value (maximum peak-to-peak level) obtained with the DUT 9 connected is stored as the measurement $S_{DUT}$, as indicated by the numeral 56 shown in FIG. 4. In order to provide a calibrated measurement, that is, a measurement having a referenceable amplitude, this measured value must be scaled.

Finally, the measured value obtained at the step 56 shown in FIG. 4 is scaled by dividing $S_{DUT}^2$ by the scaling factor $S_{CAL}^2$, as indicated by the numeral 57 shown in FIG. 4. If there are multiple reflections within the DUT 9, the measurement and scaling steps 55 to 57 are repeated with each measured value due to a reflection $S_{DUTi}$.

The disadvantage of this technique is that, theoretically, in order to ensure that the fringe visibility is truly maximized, one must search through an infinite number of polarization states. In practice, it is possible to approach the true maximum by searching through a large number of polarization states, which is nonetheless a very tedious procedure.

It is further apparent that the calibration method in accordance with the invention is not limited to OCDR's, but it may also be used in other reflectometers having coherent signal detection means. Furthermore, the polarization stability problem is not confined to optical coherent reflectometry systems. It occurs also in optical telecommunications systems using coherent detection schemes. The calibration method in accordance with the invention can also be used to calibrate these optical telecommunications systems.

The foregoing description of various embodiments of the invention has been presented for purposes of illustration and description. It is not intended to be exhaustive or to limit the invention to the precise form disclosed, and many modifications and variations are possible in light of the above teaching. The embodiments are chosen and described to best explain the principles of the invention and its practical applications to hereby enable others skilled in the art to best utilize the invention in various embodiments and with various modifications as are suitable to the particular use contemplated. It is intended that the spirit and scope of this invention are to be defined by reference to the appended claims.

What is claimed is:

1. A method for calibrating an optical system using an optical source for generating a light beam, the optical source being coupled to an input channel of an interferometer, the interferometer comprising means coupled to the input channel for splitting the light beam and coupling the split light beam into a reference beam path and a test beam path of the interferometer and means for combining light reflected back through the reference beam path and the test beam path and coupling the combined light into an output channel of the interferometer, the optical system comprising a polarization diversity receiver coupled to the output channel for receiving the combined light, the polarization diversity receiver having two channels, comprising the steps of:
   providing means for modulating the intensity of the light beam generated by the optical source;
   intensity modulating the light beam generated by the optical source;
   detecting any imbalance in the gains of the two channels of the polarization diversity receiver while the light beam generated by the optical source is being intensity-modulated; and
   storing data related to the imbalance in the gains of the two channels of the polarization diversity receiver as calibration factors to correct for any drift in electronic gains.

2. The method of claim 1 wherein the step of intensity modulating the light beam generated by the optical source comprises varying a dc drive current applied to the optical source to thereby intensity modulate the light beam generated by the source.

3. A method for calibrating an optical system using an optical source for generating a light beam, the optical source being coupled to an input channel of an interferometer, the interferometer comprising means coupled to the input channel for splitting the light beam and coupling the split light beam into a reference beam path and a test beam path of the interferometer, a scanning reference mirror incorporated into the reference beam path for reflecting the split light beam in the reference beam path, and means for combining light reflected back through the reference beam path and the test beam path and coupling the combined light into an output channel of the interferometer, the optical system comprising a polarization diversity receiver coupled to the output channel for receiving the combined light, the polarization diversity receiver having first and second channels, comprising the steps of:
   providing means for modulating the intensity of the light beam generated by the optical source;
   providing means for controlling the polarization state of light received by the polarization diversity receiver;
   assuring that a device under test is not connected to the test beam path;
   terminating the test beam path with one of an optical absorber and a non-reflecting optical device;
   intensity modulating the light beam generated by the optical source;
   operating the polarization state controlling means to direct all of the modulated source power into the first channel of the polarization diversity receiver;
   measuring a signal level in the first channel;
   storing the signal level measured in the first channel as a first calibration parameter;
   operating the polarization state controlling means to direct all of the modulated source power into the second channel of the polarization diversity receiver;
   measuring a signal level in the second channel;
   storing the signal level measured in the second channel as a second calibration parameter;
   determining a calibration factor from the first and second calibration parameters to correct for any drift in electronic gains;
   storing the calibration factor;
   operating the polarization state controlling means so that the modulated source power is split between the first and second channels of the polarization diversity receiver such that signals produced by the first and second channels are approximately balanced;

discontinuing the intensity modulation;

disconnecting the one of the optical absorber and non-reflecting optical device from the test beam path;

terminating the test beam path with an optical means having a known reflection coefficient;

reciprocating the scanning reference mirror;

measuring a peak signal produced by the first channel, while the earlier setting of the polarization state controlling means, which produced balanced outputs from the first and second channels when the one of the optical absorber and non-reflecting optical device is measured, is maintained;

storing the measured peak signal produced by the first channel;

measuring a peak signal produced by the second channel, while the earlier setting of the polarization state controlling means, which produced balanced outputs from the first and second channels when the one of the optical absorber and non-reflecting optical device is measured, is maintained;

storing the measured peak signal produced by the second channel;

combining the calibration factor to correct for any drift in electronic gains and the measured peak signals of the first and second channels to determine a combined calibration factor; and dividing the known reflection coefficient of the optical means having the known reflection coefficient by the combined calibration factor to determine a polarization independent magnitude calibration scaling factor.

4. The method of claim 3 wherein the step of intensity modulating the light beam generated by the optical source comprises varying a dc drive current applied to the optical source to thereby intensity modulate the light beam generated by the source.

5. The method of claim 4 wherein the modulation frequency is at a Doppler frequency correlated to a velocity of the scanning reference mirror.

6. The method of claim 3 wherein the step of providing means for controlling the polarization state of light received by the polarization diversity receiver comprises providing a polarization controller incorporated into the output channel for controlling the polarization state of light received by the polarization diversity receiver and wherein the steps of operating the polarization state controlling means to direct all of the modulated source power into the respective first and second channels of the polarization diversity receiver comprise operating the polarization controller so that all of the modulated source power is directed into the first and second channels of the polarization diversity receiver, respectively.

7. The method of claim 3 wherein the step of determining a calibration factor from the first and second calibration parameters comprises computing the ratio of the first calibration parameter to the second calibration parameter.

8. The method of claim 6 wherein the step of operating the polarization state controlling means so that the modulated source power is split between the first and second channels of the polarization diversity receiver such that signals produced by the first and second channels are balanced comprises operating the polarization controller so that the modulated source power is split between the first and second channels of the polarization diversity receive such that signals produced by the first and second channels at outputs of envelope detectors incorporated into the polarization diversity receiver are approximately balanced.

9. The method of claim 3 wherein the step of terminating the test beam path with an optical means having a known reflection coefficient comprises allowing a terminus of the test beam path to interface with the atmosphere, which produces approximately a 4.0 percent reflection.

10. The method of claim 3, further comprising the steps of:

disconnecting the optical means having the known reflection coefficient from the test beam path;

connecting a device under test to the test beam path; and measuring at least one reflection from the device under test using the polarization independent magnitude calibration scaling factor determined in accordance with the step of dividing the known reflection coefficient of the optical means having the known reflection coefficient by the combined calibration factor to thereby produce a calibrated measurement on the device under test having a referenceable amplitude value.

11. The method of claim 1 wherein the optical system is an optical coherency domain reflectometer which incorporates the optical source and the interferometer.

12. The method of claim 1 wherein the optical system is an optical fiber telecommunications system.

13. The method of claim 3 wherein the optical system is an optical coherence domain reflectometer which incorporates the optical source and the interferometer.

14. The method of claim 3 wherein the optical system is an optical fiber telecommunications system.

15. A method for calibrating an optical system using an optical source for generating a light beam, the optical source being coupled to an input channel of an interferometer, the interferometer comprising means coupled to the input channel for splitting the light beam and coupling the split light beam into a reference beam path and a test beam path of the interferometer, a scanning reference mirror incorporated into the reference beam path for reflecting the split light beam in the reference beam path, and means for combining light reflected back through the reference beam path and the test beam path and coupling the combined light into an output channel of the interferometer, the optical system comprising a receiver coupled to the output channel for receiving the combined light, the receiver having at least one photodetector, comprising the steps of:

providing means for controlling the polarization state of light received by the receiver;

assuring that a device under test is not connected to the test beam path;

terminating the test beam path with an optical means having a known reflection coefficient;

reciprocating the scanning reference mirror;

operating the polarization state controlling means, as the scanning reference mirror is reciprocated, to maximize fringe visibility;

measuring the maximum peak-to-peak level of the fringe visibility; and storing the maximum peak-to-peak level of the fringe visibility as a calibration scaling factor.

16. The method of claim 15 wherein the step of providing means for controlling the polarization state of light received by the receiver comprises providing a polarization controller incorporated into one of the reference beam path and the test beam path for controlling the polarization state of light received by the receiver.

17. The method of claim 15 wherein the step of terminating the test beam path with an optical means having a known reflection coefficient comprises allowing a terminus of the test beam path to interface with the atmosphere, which produces approximately a 4.0 percent reflection.

18. The method of claim 15 wherein the step of measuring the maximum peak-to-peak level of the fringe visibility comprises detecting the maximum envelope peak-to-peak level of the response of an envelope detector incorporated into the receiver.

19. The method of claim 15, further comprising the steps of:

disconnecting the optical means having the known reflection coefficient from the test beam path;
connecting a device under test to the test beam path;
reciprocating the scanning reference mirror;
operating the polarization state controlling means, as the scanning reference mirror is reciprocated, to maximize fringe visibility while the device under test is connected to the test beam path;
measuring the maximum peak-to-peak level of the fringe visibility while the device under test is connected to the test beam path; and
dividing the measured maximum peak-to-peak level of the fringe visibility, while the device under test is connected to the test beam path, by the stored calibration scaling factor to thereby produce a calibrated measurement on the device under test having a referenceable amplitude value.

20. The method of claim 15 wherein the optical system is an optical coherence domain reflectometer which incorporates the optical source and the interferometer.

* * * * *